May 31, 1932.  E. BUGATTI  1,860,771
VIBRATION DAMPER
Filed July 5, 1930
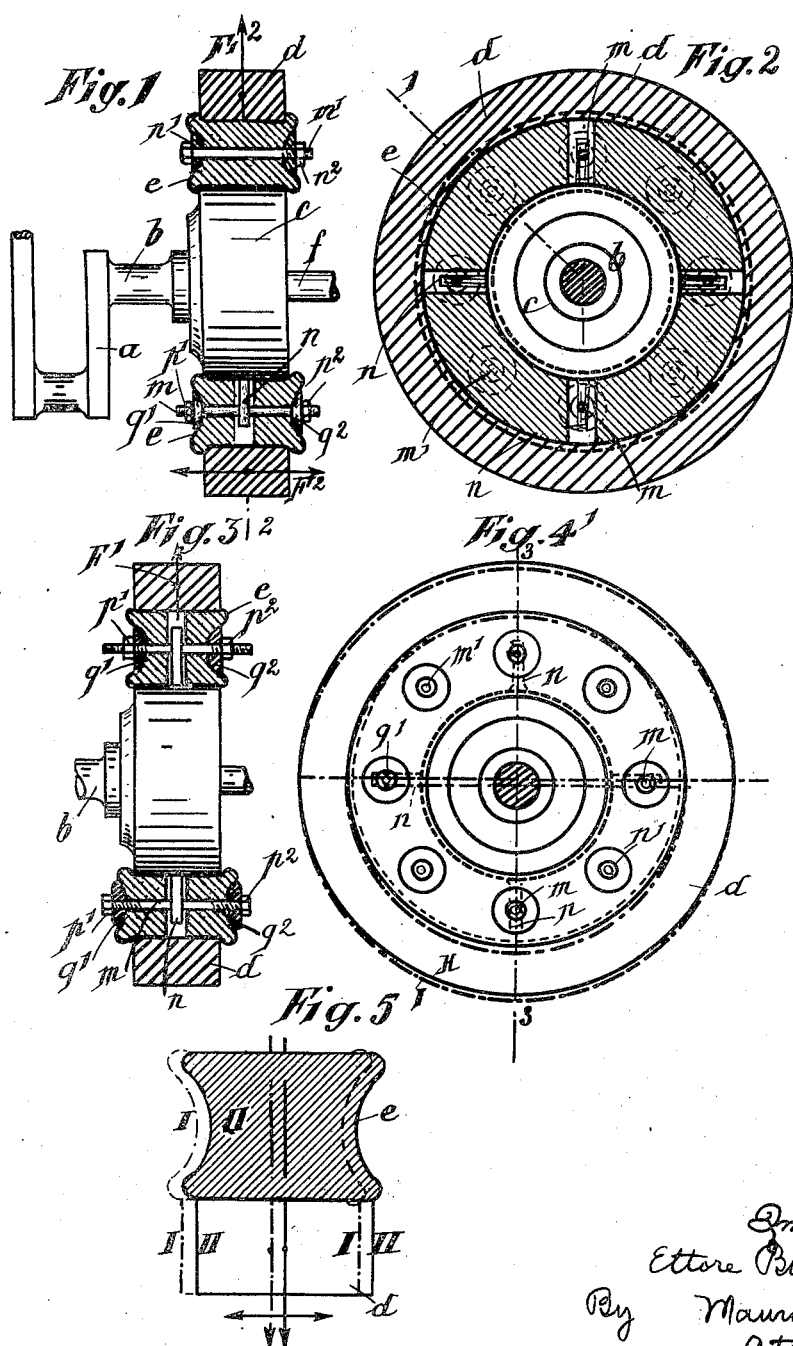

Patented May 31, 1932

1,860,771

UNITED STATES PATENT OFFICE

ETTORE BUGATTI, OF MOLSHEIM, FRANCE

VIBRATION DAMPER

Application filed July 5, 1930, Serial No. 465,798, and in France November 14, 1929.

It has already been proposed to mount the fly-wheel, that is to say its principal mass, elastically on the engine shaft, and especially at the end of said shaft, so that the fly-wheel still acts as a motion regulating organ, but, owing to its elastic connection, does not give rise to disturbing reactions which would produce detrimental phenomena which are well known to technicians.

The driving shaft can then transmit its torque, in the ordinary way, through the intermediary of any known clutches or couplings.

The present invention has for its object the adjustable arrangement of the elastic connecting means between the fly-wheel and the shaft, so that said fly-wheel may be centered through longitudinal or radial displacement. In that way the unbalance that could be produced by a fly-wheel rotating off center, i. e., the center of which does not coincide with the center of rotation of the driving shaft, is avoided.

In an embodiment of this adjustable arrangement, the elastic connecting means, such as: rubber ring or rubber washers or blocks, is provided with securing studs with nuts on each side of said blocks or ring.

A preferred embodiment of the invention will be described with reference to the appended drawings given by way of example, in which:

Fig. 1 is a side view of the fly-wheel mounted on the shaft partially cut on line 1—1 of Fig. 2.

Fig. 2 is a section on the line 2—2 of Fig. 1.

Figs. 3 and 4 are similar views showing in what manner the adjustment in the radial direction can be effected.

Fig. 5 is a diagrammatical view showing in what manner the adjustment in the axial direction can be effected.

In the embodiment that is shown the crank shaft $ab$ transmits to shaft $f$ the energy of the engine through the clutch contained in a drum $c$ integral with the crank shaft. Between said crank shaft and fly-wheel $d$ is interposed a rubber ring or rubber washers or blocks $e$ or any other elastic joint. Said washers, ring or the like are secured to drum $c$ through studs $m$ passing through the rubber blocks or rings $e$ and integral with radial arms $n$ rigidly secured to drum $c$. Nuts $p^1$, $p^2$ are screwed at the ends of studs $m$, and metallic washers $q^1$, $q^2$ are interposed between said studs and the rubber blocks.

Some of the studs may not be rigidly secured to drum $c$ by means of arms, as it is shown in Fig. 1 in which some studs are constituted by bolts $m^1$, having a head $n^1$ and a nut $n^2$.

It will be easily understood that by screwing or unscrewing nuts $p^1$, $p^2$, $n^2$ it is possible to obtain a very accurate centering of fly-wheel $d$ with respect to driving shaft $b$, as well in the radial direction (arrow $F^1$) as in the longitudinal direction (arrow $F^2$).

Figs. 3 and 4 show how this adjustment in a radial direction can be effected.

The fly-wheel being in the position shown in full lines, it is possible, by action on nuts $p^1$, $p^2$, $n^2$ so as to more or less compress the rubber blocks, to radially displace (arrow $F^1$) fly-wheel with respect to the axis of the drum, which brings said fly-wheel from the eccentric position shown in full lines in Figs. 3 and 4 to the centered position shown in dotted lines; in Fig. 4, the eccentricity is shown in $r$.

As for the longitudinal or axial adjustment (Fig. 5) it is obtained by action in opposite manners on nuts $p^1$ and $p^2$; i. e. by screwing one of the nuts and unscrewing the other, which displaces the rubber blocks axially, the flywheel thus passing from position I to position II.

By suitably distributing the tightening of the different blocks it is possible to angularly displace the fly-wheel until its axis is exactly parallel to that of the driving shaft. For this purpose it is possible, for instance, to leave the tightening of the blocks that are at the upper part of the stopped fly-wheel such as it is, and to act on the screws of the blocks that are at the lower part.

Any other method of adjustment could obviously be adopted without departing from the spirit of my invention.

What I claim is:—

1. A system of mounting a fly wheel on the clutch drum of a driving shaft which comprises in combination, at least one mass of an elastic material interposed between said drum and said fly wheel for connecting the one to the other, a plurality of radial arms integral with said drum extending into said mass, studs integral with said arms and at right angles thereto so as to extend through said means in a direction parallel to said shaft, and nuts at either extremity of said studs applied against said mass so as to more or less compress it, whereby the position of the fly wheel with respect to the drum can be adjusted in the axial as well as in the radial direction.

2. A system of mounting a fly wheel on the clutch drum of a driving shaft which comprises in combination, a plurality of rubber blocks interposed between said drum and said fly wheel for connecting the one to the other, a plurality of radial arms integral with said drum extending into said rubber blocks, studs integral with said arms and at right angles thereto so as to extend through said rubber blocks in a direction parallel to said shaft, and nuts at either extremity of said studs applied against said rubber blocks so as to more or less compress them, whereby the position of the fly wheel with respect to the drum can be adjusted in the axial as well as in the radial direction.

3. A system of mounting a fly wheel on the clutch drum of a driving shaft which comprises in combination, a plurality of rubber blocks interposed between said drum and said fly wheel for connecting the one to the other, a plurality of radial arms integral with said drum extending into said rubber blocks, studs integral with said arms and at right angles thereto so as to extend through said rubber blocks in a direction parallel to said shaft, a plurality of other studs independent of said arms extending throughout said blocks in a direction parallel to said shaft, and nuts at either extremity of said studs applied against said rubber blocks so as to more or less compress them, whereby the position of the fly wheel with respect to the drum can be adjusted in the axial as well as in the radial direction.

In testimony whereof I have signed this specification.

ETTORE BUGATTI.